United States Patent
Okita et al.

(10) Patent No.: US 9,716,268 B2
(45) Date of Patent: Jul. 25, 2017

(54) NONAQUEOUS ELECTROLYTE SECONDARY BATTERY

(71) Applicant: SANYO Electric Co., Ltd., Moriguchi-shi, Osaka (JP)

(72) Inventors: Kazunari Okita, Hyogo (JP); Tadayoshi Tanaka, Osaka (JP); Takatoshi Higuchi, Hyogo (JP); Hiroyuki Fujimoto, Hyogo (JP); Yoshinori Kida, Hyogo (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 96 days.

(21) Appl. No.: 14/388,077

(22) PCT Filed: Feb. 28, 2013

(86) PCT No.: PCT/JP2013/055274
§ 371 (c)(1),
(2) Date: Sep. 25, 2014

(87) PCT Pub. No.: WO2013/146054
PCT Pub. Date: Oct. 3, 2013

(65) Prior Publication Data
US 2015/0044552 A1 Feb. 12, 2015

(30) Foreign Application Priority Data
Mar. 29, 2012 (JP) .................. 2012-077100

(51) Int. Cl.
*H01M 4/36* (2006.01)
*H01M 4/505* (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
CPC ...... H01M 4/366; H01M 4/505; H01M 4/525; H01M 10/052; H01M 10/0567;
(Continued)

(56) References Cited

U.S. PATENT DOCUMENTS

| | | | |
|---|---|---|---|
| 5,789,114 A | 8/1998 | Adachi et al. | |
| 6,893,776 B2 * | 5/2005 | Naruoka | C01G 51/42 252/521.2 |

(Continued)

FOREIGN PATENT DOCUMENTS

| | | |
|---|---|---|
| CN | 1661846 A | 8/2005 |
| CN | 101156260 A | 4/2008 |

(Continued)

OTHER PUBLICATIONS

J-PlatPat Machine Translation of the detailed description of JP 2002-279983A (Sep. 2002).*

(Continued)

*Primary Examiner* — Gregg Cantelmo
(74) *Attorney, Agent, or Firm* — Westerman, Hattori, Daniels & Adrian, LLP

(57) ABSTRACT

A positive electrode including a positive electrode mixture layer containing a positive electrode active material represented by $Li_{1.08}Ni_{0.43}Co_{0.26}Mn_{0.24}O_2$ having a layered structure, a negative electrode containing a negative electrode active material, a separator provided between the positive electrode and the negative electrode, and a nonaqueous electrolyte are included, in which a film composed of carbon black permeable to lithium ions is formed on a surface of the positive electrode active material, and the film contains lithium fluoride particles serving as metal halide particles.

7 Claims, 1 Drawing Sheet

(51) Int. Cl.
  *H01M 4/525* (2010.01)
  *H01M 10/052* (2010.01)
  *H01M 10/0567* (2010.01)
  *H01M 10/0568* (2010.01)
  *H01M 10/0569* (2010.01)

(52) U.S. Cl.
  CPC ..... *H01M 10/052* (2013.01); *H01M 10/0567* (2013.01); *H01M 10/0568* (2013.01); *H01M 10/0569* (2013.01); *H01M 2300/0017* (2013.01)

(58) Field of Classification Search
  CPC ......... H01M 10/0568; H01M 10/0569; H01M 2300/0017
  See application file for complete search history.

(56) References Cited

U.S. PATENT DOCUMENTS

| | | | | |
|---|---|---|---|---|
| 7,947,092 | B1* | 5/2011 | Nagata | H01M 4/1391 29/623.1 |
| 8,492,028 | B2 | 7/2013 | Itou et al. | |
| 2004/0253518 | A1* | 12/2004 | Hosoya | H01M 4/13 429/232 |
| 2005/0191553 | A1 | 9/2005 | Fujihara et al. | |
| 2006/0236528 | A1* | 10/2006 | Xu | H01M 10/0525 29/623.1 |
| 2007/0082265 | A1* | 4/2007 | Itou | H01M 4/131 429/223 |
| 2008/0138703 | A1 | 6/2008 | Deguchi et al. | |
| 2009/0029248 | A1 | 1/2009 | Deguchi et al. | |
| 2009/0087362 | A1* | 4/2009 | Sun | C01G 45/1221 423/179.5 |
| 2010/0247986 | A1* | 9/2010 | Toyama | H01M 4/366 429/61 |
| 2011/0070497 | A1* | 3/2011 | Deguchi | H01M 4/131 429/223 |
| 2012/0052386 | A1 | 3/2012 | Ookita et al. | |

FOREIGN PATENT DOCUMENTS

| | | | |
|---|---|---|---|
| CN | 102047473 | A | 5/2011 |
| JP | 7-192721 | A | 7/1995 |
| JP | 09092265 | A * | 4/1997 |
| JP | 3157413 | B2 | 4/2001 |
| JP | 2002279983 | A * | 9/2002 |
| JP | 3601124 | B2 | 12/2004 |
| JP | 2005-190996 | A | 7/2005 |
| JP | 2009016234 | A | 1/2009 |
| JP | 2010-232001 | A | 10/2010 |
| JP | 2013182662 | A | 9/2013 |
| WO | 2006/067957 | A1 | 6/2006 |
| WO | 2006/080204 | A1 | 8/2006 |
| WO | 2011084817 | A1 | 7/2011 |

OTHER PUBLICATIONS

International Search Report dated Apr. 16, 2013 issued in corresponding application No. PCT/JP2013/055274.
Office Action dated Apr. 5, 2016, issued in counterpart Chinese Patent Application No. 201380016638.8. (7 pages).
Office Action dated Mar. 30, 2016, issued in counterpart Japanese Patent Application No. 2014-507572, with English translation. (8 pages).
Notification of Reasons for Refusal issued Jul. 27, 2016, in counterpart Japanese Application No. 2014-507572. (2 pages).
Office Action and Search Reaport dated Nov. 16, 2016, issued in counterpart Chinese Patent Application No. 201380016638.8. (24 pages).

* cited by examiner

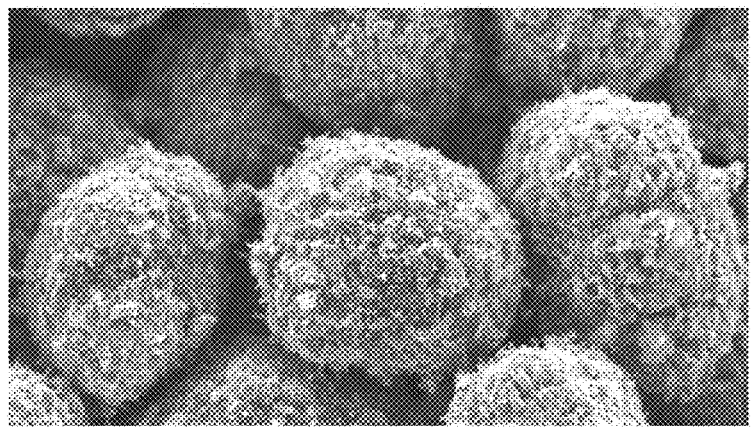

NONAQUEOUS ELECTROLYTE SECONDARY BATTERY

TECHNICAL FIELD

The present invention relates to a nonaqueous electrolyte secondary battery.

BACKGROUND ART

In recent years, lithium secondary batteries that can be small and lightweight and can have a high capacity have been widely used as power sources for cellular phones. Moreover, nonaqueous electrolyte secondary batteries have been recently attracting attention as power sources for high-power-demanding applications, such as electric power tools and electric vehicles. Furthermore, demands for higher-capacity batteries are increasing in applications that require higher-power nonaqueous electrolyte secondary batteries.

With the increase in capacity, it is increasingly important to provide the safety of batteries. In particular, nonaqueous electrolyte secondary batteries, which are characterized by having higher energy densities than those of other batteries, can lead to a rapid increase in temperature triggered by an increase in the temperature of batteries due to misuse of batteries. Thus, a nonaqueous electrolyte secondary battery is required to have higher thermal stability.

To improve nonaqueous electrolyte secondary battery, the following attempts are made:
(1) a report that surfaces of lithium-containing transition metal oxide particles are coated with a lithium compound (PTL 1 described below), and
(2) a report that 15% or more of an apparent surface of a powdery metal oxide constituting an active material is covered with a carbon material having a specific surface area of 150 m$^2$/g or more in such a manner that the carbon material has a thickness of 0.01 μm to 0.3 μm (PTL 2 described below).

CITATION LIST

Patent Literature

PTL 1: Japanese Patent No. 3157413
PTL 2: Japanese Patent No. 3601124

SUMMARY OF INVENTION

Technical Problem

However, these attempts described in items (1) and (2) have a problem in which the thermal stability cannot be improved.

Solution to Problem

According to one aspect of the present invention, a positive electrode including a positive electrode mixture layer containing a positive electrode active material, a negative electrode containing a negative electrode active material, a separator provided between the positive electrode and the negative electrode, and a nonaqueous electrolyte are included, in which a film permeable to lithium ions is formed on a surface of the positive electrode active material, and the film contains metal halide particles.

Advantageous Effects of Invention

One aspect of the present invention advantageously provides a nonaqueous electrolyte secondary battery having significantly improved thermal stability.

BRIEF DESCRIPTION OF DRAWINGS

The FIGURE is a SEM photograph of a positive electrode active material having a surface covered with a film composed of lithium fluoride and carbon black in Example 1.

DESCRIPTION OF EMBODIMENTS

In the present invention, a positive electrode including a positive electrode mixture layer containing a positive electrode active material, a negative electrode containing a negative electrode active material, a separator provided between the positive electrode and the negative electrode, and a nonaqueous electrolyte are included, in which a film permeable to lithium ions is formed on a surface of the positive electrode active material, and the film contains metal halide particles.

As described above, in the present invention, the film permeable to lithium ions is formed on the surface of the positive electrode active material, and the film contains the metal halide particles, thus significantly improving the thermal stability of the nonaqueous electrolyte secondary battery. While the reason for this is not clear in detail, in the case where the film formed on the surface of the positive electrode active material contains the metal halide particles, it is possible to effectively inhibit a reaction between oxygen released from the positive electrode active material and an electrolytic solution even in a high-temperature state (150° C. or higher). In other words, the presence of the metal halide particles in an immobilized state in the vicinity of the surface of the positive electrode active material effectively inhibits the reaction between oxygen released from the positive electrode active material and the electrolytic solution even in a high-temperature state (150° C. or higher). This will significantly improve the thermal stability.

Here, in order to effectively provide the effect, it is preferable that the halide particles be uniformly dispersed in the film.

It is conceivable that the positive electrode active material may be covered with a film consisting of the metal halide because the presence of the metal halide improves the thermal stability. However, it is difficult to form the film. Moreover, the formation of the film inhibits the transfer of lithium ions at the interface between the electrolytic solution and the positive electrode active material, thereby reducing the output characteristics. Thus, as with the structure described above, the incorporation of the metal halide particles in the film permeable to lithium ions improves the thermal stability and facilitates the transfer of lithium ions between the electrolytic solution and the positive electrode active material, thereby improving the output characteristics.

Here, the "film permeable to lithium ions" refers to a film that holds an electrolytic solution in its film. Embodiments of the film are exemplified as described below:
(1) a film provided with a space capable of holding the electrolytic solution, and
(2) a film composed of a polymeric material that swells with the electrolytic solution into a gel electrolyte.

Examples of the film described in item (1) include various films formed by dipping, thermal spraying, electrostatic treatment, and so forth. A film is preferred in which a film-forming material permeable to lithium, a metal halide particles, and a positive electrode active material are mechanochemically combined. In this structure, the film and the metal halide particles in the film are present without detaching from the positive electrode active material in, for example, the production process of a positive electrode. It is thus possible to reliably provide the effect of improving the thermal stability and inhibit a reduction in output characteristics.

Here, a method for mechanochemically making a combination is as follows: the metal halide particles and the film-forming material are uniformly subjected to solid-phase dispersion to prepare a powder, and then the powder and the positive electrode active material are mechanochemically mixed together using a dry mixer to form a film permeable to lithium ions, the film containing the metal halide particles uniformly dispersed therein. Specific examples of the dry mixer include "Nanocular", "Nobilta", and "Mechanofusion", manufactured by Hosokawa Micron Corporation; and a rotary ball mill, Hybridization System, and Mechano Micros, manufactured by Nara Machinery Co., Ltd.

The film preferably has a thickness of 0.01 µm or more and 5 µm or less. An excessively small thickness of the film can cause difficulty in holding the metal halide particles. An excessively large thickness of the film can lead to a reduction in lithium permeability and an increase in the metal halide particles present away from the surface of the positive electrode active material to cause a reduction in thermal stability.

Here, as a material for the formation of the film described in item (1), a carbon material is preferred. In particular, amorphous carbon, such as acetylene black, Ketjenblack, or carbon black, is preferred. The reason for this is that the use of the material permits the film to sufficiently hold the electrolytic solution, so that lithium ions are smoothly transferred, and electron conductivity is also increased, thereby improving output characteristics.

The carbon material preferably has a specific surface area of 20 m²/g or more. At an excessively small specific surface area, the electrolytic solution cannot be sufficiently held, in some cases. At an excessively large specific surface area of the carbon material, the cohesive force of the carbon material cannot be disaggregated. Thus, the surface of the active material particles cannot be covered, in some cases. Therefore, the carbon conductive agent layer preferably has a specific surface area of 1000 m²/g or less.

As the metal halide particles, lithium fluoride particles are most preferably used from the viewpoint of effectively inhibiting the reaction between oxygen released from the positive electrode material and the electrolytic solution. Particles composed of another metal halide, such as lithium chloride, may also be used. As the metal halide particles, for example, calcium fluoride, zirconium fluoride, magnesium chloride, calcium chloride, lithium chloride, and so forth may be used.

The proportion of the metal halide particles is preferably 0.1% by mass or more and 5% by mass or less with respect to the total amount of the positive electrode mixture layer. When the proportion of the metal halide particles is less than 0.1% by mass with respect to the total amount of the positive electrode mixture layer, the effect of the thermal stability is less likely to be sufficiently provided. When the proportion of the metal halide particles is more than 5% by mass with respect to the total amount of the positive electrode mixture layer, the capacity of the positive electrode is reduced, and the electron conductivity of the positive electrode mixture layer is reduced, thereby reducing the output characteristics, in some cases. The proportion of the metal halide particles in the film formed on the surface of the positive electrode active material (the proportion of the metal halide particles with respect to the total amount of the film-forming material and the metal halide particles) is preferably 5% by mass or more and 50% by mass or less. When the proportion of the metal halide particles in the film formed on the surface of the positive electrode active material is less than 5% by mass, the film-forming material inhibits the reaction between oxygen released from the positive-electrode material and the electrolytic solution; hence, the foregoing effect is less likely to be provided. When the proportion of the metal halide particles in the film formed on the surface of the positive electrode active material is more than 50% by mass, the permeability to lithium ions can be reduced between the positive electrode active material and the electrolytic solution to reduce the output characteristics.

As the positive electrode active material in the present invention, a lithium-containing transition metal oxide may be used. As the lithium-containing transition metal oxide, for example, lithium cobaltate may be used. A lithium-containing transition metal oxide having a layered structure and containing nickel may also be used. Specific examples thereof include cobalt-nickel-manganese-containing lithium compound oxides, aluminum-nickel-manganese-containing lithium compound oxides, aluminum-nickel-cobalt-containing lithium compound oxides, and cobalt-free, nickel-manganese-containing lithium compound oxides.

Of these positive electrode active materials, a lithium-containing transition metal oxide represented by the general formula $Li_{1+x}Ni_aMn_bCo_cO_{2+d}$ (wherein in the formula, x, a, b, c, and d satisfy requirements: $x+a+b+c=1$, $0.6 \leq a+b$, $0 < x \leq 0.1$, $0 \leq c/(a+b) < 0.65$, $0.7 \leq a/b \leq 2.0$, and $-0.1 \leq d \leq 0.1$) is preferably used, the lithium-containing transition metal oxide having a layered structure.

Here, in the forgoing lithium-containing transition metal oxide, the reason for the use of the composition ratios such that the composition ratio c of cobalt, the composition ratio a of nickel, and the composition ratio b of manganese satisfy the requirements $0 \leq c/(a+b) < 0.65$, and $0.6 \leq a+b$ is that the ratio of cobalt is reduced to reduce the material cost. In the present invention, the thermal stability of a nonaqueous electrolyte secondary battery containing the positive electrode active material composed of the low-cost lithium-containing transition metal oxide with a low proportion of cobalt is improved and thus can be used as a power source for tools and automobiles.

In the foregoing lithium-containing transition metal oxide, the reason for the use of the lithium-containing transition metal oxide such that the composition ratio a of nickel and the composition ratio b of manganese satisfy the requirement $0.7 \leq a/b \leq 2.0$ is as follows: When the proportion of nickel is increased to a level at which the value a/b is more than 2.0, the thermal stability of the lithium-containing transition metal oxide is markedly reduced to lower the exothermic peak temperature, thus reducing the safety, in some cases. When the value a/b is less than 0.7, the composition ratio of manganese is high, so that an impurity layer is formed to reduce the capacity. Therefore, the value a/b is preferably within the range described above. When particular importance is attached to the inhibition of a reduction in capacity, it is more preferable that the requirement $0.7 \leq a/b \leq 1.5$ be satisfied.

In the foregoing lithium-containing transition metal oxide, the reason for the use of the lithium-containing transition metal oxide such that x in the composition ratio (1+x) of lithium satisfies the requirement 0<x≤0.1 is as follows: When 0<x, the output characteristics are improved. When x>0.1, an alkali remaining on the surface on the lithium-containing transition metal oxide is increased, a slurry gels in a process for producing a battery, and the amount of the transition metal performing redox reaction is reduced, thereby reducing the capacity. From this viewpoint, the lithium-containing transition metal oxide that satisfies the requirement 0.05≤x≤0.1 is more preferably used.

In the foregoing lithium-containing transition metal oxide, the reason d in the composition ratio (2+d) of oxygen satisfies the requirement −0.1≤d≤0.1 is to prevent damage of the crystal structure caused by bringing the lithium-containing transition metal oxide into an oxygen-deficient state or an oxygen-excess state.

(Other Matters)

(1) The lithium-containing transition metal oxide may contain at least one selected from the group consisting of boron (B), fluorine (F), magnesium (Mg), aluminum (Al), titanium (Ti), chromium (Cr), vanadium (V), iron (Fe), copper (Cr), zinc (Zn), niobium (Nb), molybdenum (Mo), zirconium (Zr), tin (Sn), tungsten (W), sodium (Na), and potassium (K). In the case where the lithium-containing transition metal oxide containing the foregoing element is used, the effect of the thermal stability should be further provided.

(2) As the negative electrode active material, for example, a carbon material, a metal or an alloy material which is alloyed with lithium, or its oxide may be used. Of these materials, the carbon material is preferably used. Specific examples of the carbon material include natural graphite, artificial graphite, mesophase pitch-based carbon fibers (MCF), mesocarbon microbeads (MCMB), coke, hard carbon, fullerenes, and carbon nanotubes.

(3) A nonaqueous solvent used for a nonaqueous electrolyte is not particularly limited. Specific examples of the nonaqueous solvent preferably used include cyclic carbonates, such as ethylene carbonate, propylene carbonate, butylene carbonate, and vinylene carbonate; open-chain carbonates, such as dimethyl carbonate, methylethyl carbonate, and diethyl carbonate; and solvent mixtures of the cyclic carbonates and the open-chain carbonates.

In addition, an ionic liquid is preferably used as a nonaqueous solvent. As a cation of the ionic liquid, a pyridinium cation, an imidazolium cation, a quaternary ammonium cation, or the like is preferably used. As an anion of the ionic liquid, a fluorine-containing imide-based anion or the like is preferably used.

Specific examples of a solute used for the nonaqueous electrolyte include lithium salts each containing one or more elements selected from the group consisting of P, B, F, O, S, N, and Cl. Specific examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, and $LiClO_4$. Of these compounds, $LiPF_6$ is preferably used as a solute from the viewpoint of achieving excellent charge-discharge characteristics and durability. Particularly preferably, a lithium salt that contains an oxalate complex serving as an anion is further contained in the solute.

The lithium salt that contains the oxalate complex serving as an anion is not limited to lithium bis(oxalato)borate (LiBOB) described in examples below. A lithium salt containing an anion with a central atom coordinating with $C_2O_4^{2-}$, such as $Li[M(C_2O_4)_xR_y]$ (wherein in the formula, M represents an element selected from transition metals, group IIIb elements, group IVb elements, and group Vb elements; R represents a group selected from halogens, alkyl groups, and halogen-substituted alkyl groups; x represents a positive integer; and y represents zero or a positive integer), may be used. Specific examples thereof include $Li[B(C_2O_4)F_2]$, $Li[P(C_2O_4)F_4]$, and $Li[P(C_2O_4)_2F_2]$. To form a stable film on the surface of the active material even in a high-temperature environment, LiBOB is preferably used.

The concentration of the lithium salt containing an oxalate complex serving as an anion in the nonaqueous solvent is preferably 0.05 mol/L or more and 0.3 mol/L or less. When the concentration of the lithium salt containing an oxalate complex serving as an anion in the nonaqueous solvent is less than 0.05 mol/L, the effect of addition can be insufficient. When the concentration of the lithium salt containing an oxalate complex serving as an anion in the nonaqueous solvent is more than 0.3 mol/L, the discharge capacity of the battery can be reduced.

(4) Collectors used for the positive and negative electrodes are not particularly limited as long as the collectors have conductivity. Each of the collectors may be formed of foil composed of a metal or an alloy having conductivity. Specifically, the collector used for the negative electrode may be formed of, for example, foil composed of a metal, such as copper, or an alloy containing a metal, such as copper. The collector used for the positive electrode may be formed of foil composed of, for example, a metal, such as aluminum, or an alloy containing a metal, such as aluminum. Each of the collectors may have a thickness of, for example, about 5 μm to about 30 μm. The mixture layer formed on the collector may have a thickness of, for example, about 50 μm to about 200 μm.

(5) The separator provided between the positive electrode and the negative electrode may be formed of, for example, a polypropylene or polyethylene separator, a polypropylene-polyethylene multilayer separator, or the like.

EXAMPLES

While the present invention will be described in more detail below by specific examples, the present invention is not limited to these examples. Appropriate changes may be made without departing from the gist of the invention.

Example 1

Production of Positive Electrode $Li_2CO_3$ and $Ni_{0.46}Co_{0.28}Mn_{0.26}(OH)_2$ prepared by a coprecipitation method were mixed together in a predetermined ratio. The mixture was fired at 900° C. in air to prepare a positive electrode active material composed of $Li_{1.08}Ni_{0.43}Co_{0.26}Mn_{0.24}O_2$ with a layered structure. In parallel with this operation, carbon black Super P (specific surface area: 62 m$^2$/g, average particle diameter: 40 nm, manufactured by TIMCAL) and lithium fluoride were mixed together in powder form with a grinder in a mass ratio of carbon black:lithium fluoride=5:1.

Next, the positive electrode active material and the powder mixture were mixed together by a mechanochemical method in a mass ratio of positive electrode active material: powder mixture=91:6 (more specifically, in a mass ratio of positive electrode active material:carbon black:lithium fluoride=91:5:1) with a dry mixer Nobilta (NOB-130) manufactured by Hosokawa Micron Corporation.

Here, the powder prepared by the mechanochemical method was observed with a scanning electron microscope (SEM) and found that films each containing lithium fluoride uniformly dispersed in carbon black were formed on the particle surfaces of the positive electrode active material as illustrated in the FIGURE.

Next, a solution of polyvinylidene fluoride dissolved in N-methyl-2-pyrrolidone and the positive electrode active material particles covered with the films were kneaded with a kneader to prepare a positive electrode mixture slurry. In the positive electrode mixture slurry, the mass ratio of the positive electrode active material to carbon black to lithium fluoride to polyvinylidene fluoride was 91:5:1:3.

The positive electrode mixture slurry was applied on both sides of aluminum foil serving as a positive electrode collector, dried, and rolled with reduction rolls to form positive electrode mixture layers on both sides of the positive electrode collector. Finally, a collector tab was attached, thereby producing a positive electrode.

Production of Negative Electrode

A graphite powder serving as a negative electrode active material was added to a solution, serving as a thickener, of carboxymethylcellulose (CMC) dissolved in water. After the mixture was stirred, SBR serving as a binder was added thereto, thereby preparing a negative electrode mixture slurry. In the negative electrode mixture slurry, the mass ratio of graphite to CMC to SBR was 98:1:1. Then the negative electrode mixture slurry was applied on both sides of a negative electrode collector formed of copper foil, dried, and rolled with reduction rolls to form negative electrode mixture layers on both sides of the negative electrode collector. Finally, a collector tab composed of nickel was attached, thereby producing a negative electrode.

Preparation of Nonaqueous Electrolyte $LiPF_6$ serving as a supporting electrolyte was dissolved, in a concentration of 1 mol/L, in a solvent of ethylene carbonate (EC), methylethyl carbonate (MEC), and dimethyl carbonate (DMC) mixed in a volume ratio of 3:3:4. Furthermore, 1% by mass of vinylene carbonate was dissolved thereto. Then lithium bi(oxalato) borate (LiBOB) was dissolved thereto in a concentration of 0.1 mol/L, thereby preparing a nonaqueous electrolyte.

[Production of Nonaqueous Electrolyte Secondary Battery]

The positive electrode and the negative electrode produced as described above were rolled so as to be opposed to each other with a separator composed of polyethylene. The resulting roll was pressed to produce a flat electrode assembly. Then the electrode assembly was enclosed in an aluminum laminated package together with the nonaqueous electrolyte, thereby producing nonaqueous electrolyte secondary battery (battery capacity: 16 mAh) A1.

Example 2

Nonaqueous electrolyte secondary battery (battery capacity: 16 mAh) A2 was produced as in Example 1, except that a nonaqueous electrolyte in which lithium bis(oxalato)borate (LiBOB) was not dissolved was used.

Comparative Example 1

Nonaqueous electrolyte secondary battery Z1 was produced as in Example 1, except that the positive electrode mixture slurry was prepared by kneading the positive electrode active material with a surface on which a film was not formed, carbon black, and polyvinylidene fluoride in a mass ratio of 92:5:3.

Comparative Example 2

Nonaqueous electrolyte secondary battery Z2 was produced as in Example 1, except that the positive electrode mixture slurry was prepared by kneading the positive electrode active material with a surface on which a film was not formed, carbon black, lithium fluoride, and polyvinylidene fluoride in a mass ratio of 91:5:1:3.

Experiment

The exothermic peak intensity of each of batteries A1, A2, Z1, and Z2 was measured as described below. Table 1 describes the results. The exothermic peak intensity of each of batteries A1, A2, and Z2 was expressed as an index when the exothermic peak intensity of battery Z1 was defined as 100.

Experimental Conditions

A constant-current charge of each of batteries A1, A2, Z1, and Z2 was conducted at a charge current of (¼) It until the voltage reached 4.1 V. Then a constant-voltage charge was conducted at 4.1 V until the charge current reached (1/20) It. After a non-operating time of 10 minutes, discharge was conducted at a discharge current of (¼) It until the voltage reached 2.5 V. After the charge-discharge cycle had been performed twice, a constant-current charge was conducted at a charge current of (¼) It until the voltage reached 4.1 V, and then a constant-voltage charge was conducted at 4.1 V until the charge current reached (1/20) It.

The electrode assembly of each battery being in a fully charged state described above was taken out by opening the laminate. The electrode assembly was placed in a pressure-resistant container for calorimetry. The temperature was raised from 30° C. to 300° C. to study the peak height (exothermic peak intensity) of the main exothermic peak with a calorimeter C80 manufactured by Setaram Instrumentation. The rate of temperature increase was 1.0° C./min.

TABLE 1

| Battery | Positive electrode active material | Metal halide (Proportion in positive electrode mixture layer) | Covering of surface | Lithium salt containing oxalate complex serving as anion | Exothermic peak intensity |
|---|---|---|---|---|---|
| A1 | $Li_{1.08}Ni_{0.43}Co_{0.26}Mn_{0.24}O_2$ | lithium fluoride (1% by mass) | yes | LiBOB (0.1 mol/L) | 57.3 |
| A2 | | lithium fluoride (1% by mass) | yes | no | 91.0 |

TABLE 1-continued

| Battery | Positive electrode active material | Metal halide (Proportion in positive electrode mixture layer) | Covering of surface | Lithium salt containing oxalate complex serving as anion | Exothermic peak intensity |
|---|---|---|---|---|---|
| Z1 | | no | no | LiBOB (0.1 mol/L) | 100 |
| Z2 | | lithium fluoride (1% by mass) | no | LiBOB (0.1 mol/L) | 93.9 |

As is clear from Table 1, in battery Z2 in which lithium fluoride is simply contained in the positive electrode mixture layer (lithium fluoride is simply incorporated in the positive electrode mixture layer), the exothermic peak intensity is reduced, compared with battery Z1 in which lithium fluoride is not contained in the positive electrode mixture layer. However, the degree of reduction is low. In contrast, in each of batteries A1 and A2 in which the lithium fluoride-containing films composed of carbon black are each formed on the surface of the positive electrode active material, the exothermic peak intensity is reduced, compared with battery Z1, and the exothermic peak intensity is reduced, even compared with battery Z2, regardless of the fact that the proportion of lithium fluoride in the positive electrode mixture layer is equal to that of battery Z2. The results demonstrated that when the metal halide particles are held in the ion-permeable film and located on the surface of the positive electrode active material, the thermal stability is improved.

A comparison between battery A1 and battery A2 reveals that in battery A1 in which lithium bis(oxalato)borate (LiBOB) is contained in the electrolyte, the exothermic peak is markedly reduced, compared with battery A2 in which lithium bis(oxalato)borate (LiBOB) is not contained in the electrolyte, and the exothermic peak intensity is significantly reduced, compared with battery Z1. The results demonstrated that when the lithium salt containing the oxalate complex serving as an anion is contained in the nonaqueous electrolyte, the thermal stability is further improved.

As described above, the thermal stability is particularly significantly improved when the electrolyte contains the lithium salt containing the oxalate complex serving as an anion. The reason for this is not clear in detail but is presumably that the film composed of the lithium salt containing the oxalate complex serving as an anion is formed on the surfaces of the positive electrode active material particles, and the film permits the metal halide particles to be further tightly fixed in the vicinity of the surfaces of the positive electrode active material particles, so that the metal halide more effectively provides the effect of improving the thermal stability.

INDUSTRIAL APPLICABILITY

The present invention should be applied to driving power sources for mobile information terminals, such as cellular phones, notebook personal computers, and smartphones, and high-power-demanding driving power sources for HEVs and electric power tools.

The invention claimed is:

1. A nonaqueous electrolyte secondary battery comprising:
    a positive electrode including a positive electrode mixture layer containing a positive electrode active material;
    a negative electrode containing a negative electrode active material;
    a separator provided between the positive electrode and the negative electrode; and
    a nonaqueous electrolyte,
    wherein a film of carbon material is formed over a surface of the positive electrode active material and metal halide particles are included in said film,
    the positive electrode active material is a lithium-containing transition metal oxide having a layered structure,
    the lithium-containing transition metal oxide containing nickel,
    the film of carbon material contains the metal halide particles uniformly dispersed therein, and
    a proportion of the metal halide particles with respect to a total amount of the film of carbon material and the metal halide particles included therein is 5% by mass or more and 50% by mass or less.

2. The nonaqueous electrolyte secondary battery according to claim 1, wherein the nonaqueous electrolyte contains a nonaqueous solvent and a lithium salt containing an oxalate complex serving as an anion.

3. The nonaqueous electrolyte secondary battery according to claim 2, wherein the lithium salt containing an oxalate complex serving as an anion is lithium bis(oxalato)borate, and the concentration of the lithium bis(oxalato)borate in the nonaqueous solvent is 0.05 mol/L or more and 0.3 mol/L or less.

4. The nonaqueous electrolyte secondary battery according to claim 1, wherein the film is composed of amorphous carbon.

5. The nonaqueous electrolyte secondary battery according to claim 1, wherein the metal halide particles are lithium fluoride particles.

6. The nonaqueous electrolyte secondary battery according to claim 1, wherein the proportion of the metal halide particles is 0.1% by mass or more and 5% by mass or less with respect to the total amount of the positive electrode mixture layer.

7. A nonaqueous electrolyte secondary battery comprising:
    a positive electrode including a positive electrode mixture layer containing a positive electrode active material;
    a negative electrode containing a negative electrode active material;
    a separator provided between the positive electrode and the negative electrode; and
    a nonaqueous electrolyte,
    wherein a mixture of carbon material and metal halide particles is coated over a surface of said positive electrode active material,
    the positive electrode active material is a lithium-containing transition metal oxide having a layered structure,
    the lithium-containing transition metal oxide containing nickel, and
    the carbon material and the metal halide particles are uniformly mixed therein.

* * * * *